United States Patent [19]
Ghelfi

[11] 3,905,796

[45] Sept. 16, 1975

[54] PROCESS FOR THE DEHYDRATION AND GRANULATION OF MANURE-BASE FERTILIZERS

[75] Inventor: Giovanni Ghelfi, Uster, Switzerland

[73] Assignee: Intereko S. A., Switzerland

[22] Filed: July 9, 1973

[21] Appl. No.: 377,275

[30] Foreign Application Priority Data
July 13, 1972   Switzerland...................... 10489/72

[52] U.S. Cl.................................. 71/21; 71/64 DA
[51] Int. Cl.²............................................ C05F 3/00
[58] Field of Search.......................... 71/21, 64 DA

[56] References Cited
UNITED STATES PATENTS

| | | | |
|---|---|---|---|
| 2,117,808 | 5/1938 | Jones................... | 71/64 A |
| 2,200,107 | 5/1940 | Weitz.................... | 71/21 |
| 2,287,759 | 6/1942 | Hardesty et al.......... | 71/64 DA |
| 2,965,472 | 12/1960 | Huxley et al............ | 71/64 DA |
| 3,050,383 | 8/1962 | Wilson................. | 71/21 X |
| 3,235,309 | 2/1966 | Eweson................. | 71/64 DA |
| 3,547,612 | 12/1970 | Westelaken............. | 71/21 |
| 3,607,214 | 9/1971 | Seithe.................. | 71/64 DB |
| 3,736,120 | 5/1973 | Tempe.................. | 71/9 |

FOREIGN PATENTS OR APPLICATIONS

6,905,045   10/1970   Netherlands........................... 71/21

*Primary Examiner*—Charles N. Hart
*Attorney, Agent, or Firm*—Robert E. Burns; Emmanuel J. Lobato; Bruce L. Adams

[57] ABSTRACT

A fermented manure-based fertilizer material free from solid foreign bodies is mechanically treated, by grinding and/or crushing, with the addition of pre-dried material, to provide a homogeneous and durable pulp with a water content of about 60 – 70% by weight. This pulp is then granulated into granules, and the granules are dried firstly by hot gas at 50° to partially remove superficial water. After resting to homogenize their water content, the granules are finally dried in gas at about 80° to 110°C to reduce their water content to about 10% by weight.

7 Claims, No Drawings

PROCESS FOR THE DEHYDRATION AND GRANULATION OF MANURE-BASE FERTILIZERS

The invention relates to the dehydration and granulation of manure-based fertilizers for the purposes of conservation.

In order to ensure the satisfactory preservation of cattle, horse, pig, sheep and poultry manure and so on, or other organic waste products suitable for use as soil fertilizers, these waste products are dehydrated down to a moisture content which stops rapid biological and chemical processes.

The dehydration technique generally used consists of a simple drying of the heterogeneous basic material; these processes have the disadvantage that the drying of certain portions of the material treated is continued to the point of partial destruction whereas the drying of other portions is inadequate and does not stop the production of harmful microorganisms. This heterogeneous drying is accompanied by the production of a large amount of dust.

The dried material is then granulated in a mechanical press which yields a product in the form of small cylindrical rods, the surface structure of which is often too compact as a result of the pressure used. Assimilation of this product by the soil is consequently slow and difficult.

On the other hand, the granulation in a press of a dried product originating from a heterogeneous material necessitates the remoistening of the product in the press. The thermal efficiency is therefore poor and the risk of recontamination of the product is certain.

Also, the elimination of solid mineral or metallic foreign bodies and corrosive elements is practically impossible with a material which has been inadequately homogenized before drying. The presence of such foreign bodies and corrosive elements is detrimental to the satisfactory durability of the die-plates of the press and causes abrasion and corrosion of the press and consequently high maintenance expenses.

Moreover, these known techniques lead to an irregular product because of the impossibility of regulating the dehydration process in a precise manner.

According to the invention, a process for the dehydration and granulation of manure-based fertilizers comprises subjecting a previously prepared manure-based material, before drying, to crushing and/or grinding in a plurality of stages in order to obtain a homogeneous and durable pulp, granulating said pulp into granules without modification of the original pulp structure, and drying said granules in a plurality of stages by hot gases.

It is advantageous to incorporate, before or during the granulation, additives and/or adjuvants which confer specific characteristics or properties on the product.

The product obtained is in the form of granules having diameters comprised, for example, between about 3 and 20 mm. The original pulp structure is not substantially modified so that its porosity permits maximum assimilation. Nor is the content of organic substances substantially modified, but in substance, only the useful micro-organisms are preserved.

The said additives and/or adjuvants may be trace elements adapted to reinforce the nutritive action according to the particular requirements of the crops for which it is intended, liquid manure or phytosanitary products with or without a selective action.

The manure undergoes a first fermentation in the course of storage then a second fermentation conducted in such a manner as to reduce the loss of basic fertilizing elements to a minimum. It is then introduced into a treatment installation.

Undesired foreign bodies are eliminated, first of all by manual or mechanical sorting to eliminate the foreign bodies of large dimensions liable to be found in the raw material.

Magnetic metallic substances are then eliminated by the use of a magnetic separator. Non-magnetic metallic substances are detected and removed by other means.

The process includes crushing and/or grinding in a plurality of stages, enabling a homogeneous pulp to be obtained which no longer contains particles the dimensions of which are greater than a predetermined fraction of the dimensions of the granules to be produced.

As a result of recycling predried materials during the second stage of the grinding and/or crushing, the degree of humidity of the pulp is adjusted to a suitable value comprised between about 60 and 70% by weight. This provides satisfactory granulation conditions.

The pulp thus prepared is then granulated into granules without appreciable modification of the original pulp structure. This granulation is advantageously effected by a rotary granulator, the design and operational characteristics of which enable the proper granules to be obtained, by complex movements imparted to the material which agglomerate on nuclei which, at the outset, can be provided but which form themselves when normal operation is established.

The starting of the granulation can be accelerated, particularly by the addition of graphite.

In one manner of carrying out the process, the homogeneous and durable pulp obtained after pulverization and/or grinding may first be granulated into the form of cylindrical rods which may then be converted, for example, into substantially spherical granules.

The process then continues by drying the granules thus formed. According to the invention this operation comprises a plurality of drying phases:

— predrying at a temperature not exceeding 50°C to eliminate some of the free superficial water;

— homogenization of the moisture content of the granules by simply leaving the granules at rest; and — final drying down to a residual humidity of the order of 10% by weight, by heating between about 80° to 110°C according to the properties required for the product. Finally the process provides:

— cooling granules down to ambient temperature.

After the first drying phase, the product is sized according to the dimensions desired for the finished product. The granules having a larger dimension than the selected dimension are recycled to the second pulverizing stage.

By means of this drying, effected at given temperature and during a determinate time, the destruction of parasitic seeds, of pathogenic germs and of noxious chemical elements existing in excreta, straw etc. is ensured, while the useful bacterial flora is sufficiently preserved to permit its revival under suitable conditions of humidity and temperature.

Drying may be effected by the fluidized bed technique but other drying processes, which preserve the organized structure obtained during the granulation may likewise be used.

The drying fluid may be a hot gas obtained by a direct mixture of combustion gas and air. It is likewise possible to use gases and particularly air heated in a heat exchanger by indirect contact with combustion gases or any other source of heat. Such combustion gases are produced by a high effiency burner enabling fuels of low market value to be used, without there being any unburnt residue.

The drying operation is effected with gases, the temperature of which is adjusted by mixing with fresh air to a value which avoids any overheating of the product, the temperature of which, at the end of drying, before cooling, is from about 80° to 100°C. The temperature of the gases depends inter alia on the time during which the granules are exposed thereto; it is regulated to a preestablished temperature or according to the moisture content of the gases used.

The product is cooled to a temperature in the vicinity of ambient temperature, which is harmless to the ensilage or to final bagging. Cooling may be carried out by a fluidized bed cooler fed with ambient or cooled air.

The process enables the heat comsumption to be reduced to a minimum by rational use of the air and combustion gas as a function of the material being treated.

I claim:

1. A process for dehydration of manure-based fertilizers, comprising;
    subjecting a manure-based material to treatment to obtain a homogeneous and durable pulp;
    granulating said pulp; and
    drying the resulting granules during at least two drying periods separated by a rest period enabling (1) removal of superficial water from each granule during the first drying period, (2) homogenizing the resulting moisture content of outer and inner layers of each granule during said rest period and, (3) final drying of the granules.

2. A process as claimed in claim 1, including adding adjuvants to the product at a time close to the inception of the granulating.

3. A process as claimed in claim 1, in which said granulating includes pre-granulating said homogeneous and durable pulp for converting said pulp into small cylindrical rods, and thereafter converting said rods into substantially spherical granules.

4. A process as claimed in claim 1, in which said treatment of the manure-based material is conducted to convert said pulp into particles smaller than about 1 to 3 mm.

5. A process as claimed in claim 1, including, prior to said treatment of the manure-based material, removing metallic pieces from the material.

6. A process according to claim 1, including, prior to said drying; adding dry material to the pulp to produce a particle structure of the pulp suitable for granulation; and granulating the resulting pulp while substantially maintaining said particle structure of the pulp.

7. A process according to claim 1 wherein the drying, during each drying period, is performed by passing a hot gas over said granules.

* * * * *